March 10, 1970  E. PEDERSEN  3,499,559
MOBILE AND TURNABLE DIGGING MACHINE, CRANE OR THE LIKE
Filed Aug. 30, 1967  3 Sheets-Sheet 1

INVENTOR
EGIL PEDERSEN
BY McGlew and Toren
ATTORNEYS

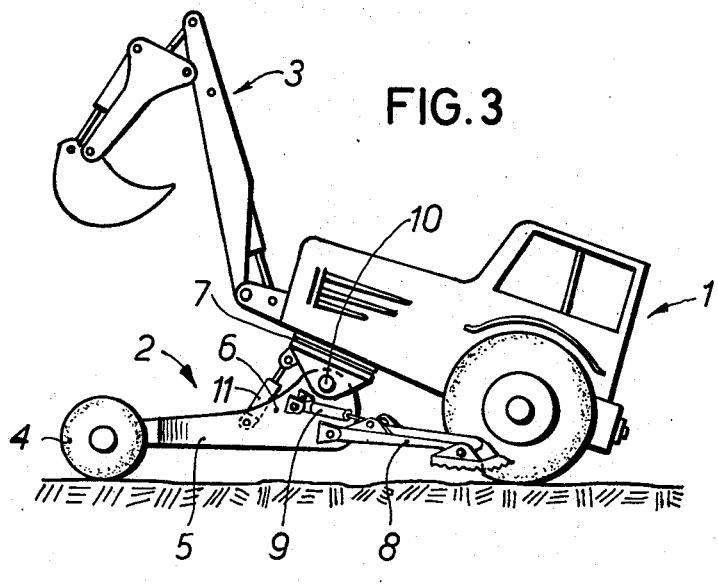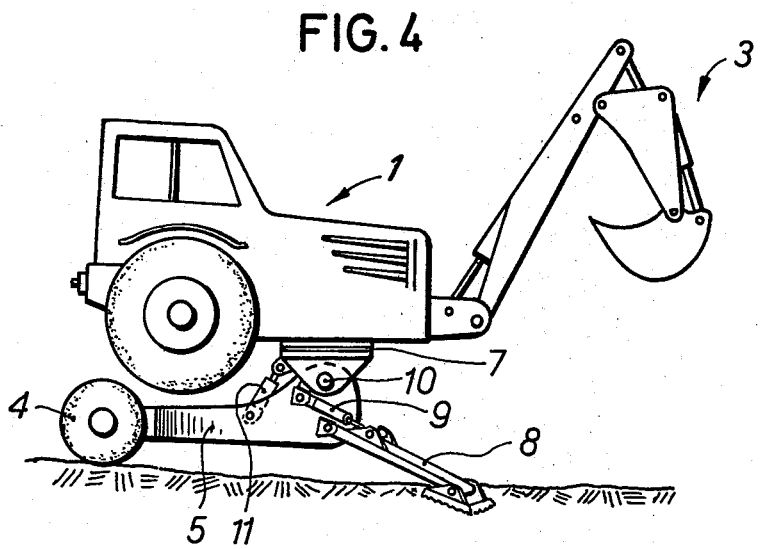

March 10, 1970   E. PEDERSEN   3,499,559
MOBILE AND TURNABLE DIGGING MACHINE, CRANE OR THE LIKE
Filed Aug. 30, 1967   3 Sheets-Sheet 3

INVENTOR.
EGIL PEDERSEN
BY
McGlew & Toren
ATTORNEYS

United States Patent Office 3,499,559
Patented Mar. 10, 1970

3,499,559
MOBILE AND TURNABLE DIGGING MACHINE, CRANE OR THE LIKE
Egil Pedersen, Hasleoya, Fevik, Norway
Filed Aug. 30, 1967, Ser. No. 664,526
Claims priority, application Norway, Sept. 9, 1966, 164,655
Int. Cl. E02f *3/32*
U.S. Cl. 214—138  7 Claims

ABSTRACT OF THE DISCLOSURE

This invention relates to a mobile and turnable digging machine, crane or the like with a drive unit which may be turned with respect to the undercarriage, and which is equipped with its own propulsion machinery, comprising a drive unit which may be turned with respect to an undercarriage and by which the driven road wheels are situated on the drive unit and the non-driven road wheels (steering wheels) are situated on the undercarriage, and by which it is possible to alternate between a driving position with the driven wheels in contact with the ground and a digging position with the same wheels at a distance from the ground.

---

This invention relates to a mobile and turnable digging machine, crane or the like with a drive unit which may be turned with respect to the undercarriage, and which is equipped with its own propulsion machinery.

A short account will be given of the most general types of digging machines which are on the market today and in general use. First and foremost should be mentioned the tracklaying excavator in which the drive unit and the excavator equipment may be turned about the undercarriage, which supports the tracks, through 360°. The advantage of this machine is that it is fully turnable. It is also mobile on the site, but it cannot be driven over longer distances by its own machinery. From site to site it must therefore be carried on special trailers. This of course makes the transportation particularly expensive and time-consuming.

Another very much used digging machine is the so-called tractor digger in which on an ordinary, but somewhat powerful, agricultural tractor, there is mounted digging equipment either at the front of or at the rear of the tractor. The digging equipment is mounted on a vertical bolt and may be swung out to the sides through about 180° with the help of hydraulic cylinders. The great advantage of this machine is that it is very easy to maneuver on site and that it may also be driven from site to site by means of its own propulsion machinery. This disadvantage of this machine is however, that the digging equipment may only be swung about 180°. It is thus impossible to dig at one end of the tractor and turn fully around and load at the other end. There is very often a need to swing the digging equipment through a 360° arc, for if the site is narrow the load-carrying vehicles are unable to reach the end at which the tractor is digging.

Finally there is a type of digger which is very like the tractor digger described above, but which in addition can raise its wheels in such a way that a platform which lies at the underside of the tractor comes into contact with the ground. The platform and the tractor itself are connected to one another with the help of a turnable disc in such a way that the tractor or the drive unit itself may turn freely through 360° about the platform which lies against the ground. This design satisfies all the elementary requirements which can be demanded of a digging machine, but the lifting mechanism for the wheels is very expensive as it requires a very special driving device for the wheels.

The present invention aims therefore to procure a mobile and turnable digging machine, crane or the like which satisfies all elementary requirements of full turning ability and full mobility, and which on account of its simplicity will be cheap in production.

This is achieved, according to the invention, by a mobile and turnable digging machine, crane or the like with a drive unit which may be turned with respect to an undercarriage and of which the primary characteristic features are that the driven road wheels are situated on the drive unit and that the non-driven road wheels (steering wheels) are situated on the undercarriage, and that, in an expedient manner, it is possible to alternate between a driving position with the driven road wheels in contact with the ground and a digging position with these wheels at a distance from the ground. A further feature of the invention is that the undercarriage consists of a trunk with a turning disc and two arms, which extend forward in the driving position, and carry the two non-driven wheels (steering wheels). It is further characteristic that on the trunk there are mounted movable, preferably hydraulically swingable, supporting legs which in the driving position are swung up from the ground and in the digging position are in contact with the ground and so directed that the turning disc lies approximately horizontal.

In order to prevent the trunk on the undercarriage from having to stand absolutely vertically in order to have the turning disc lying horizontally, the turning disc may be pivoted on the trunk in the vertical plane in such a way that the turning disc may be brought into the horizontal position even though the axis of the trunk deviates somewhat from the vertical position. A further feature of the invention is that the drive unit may consist of a normal tractor from which the front wheels and the front suspension have been removed. In this way, use may be made of an inexpensive mass product, thereby avoiding the need for a special drive unit which would be very costly to produce.

The invention will in the following be explained in more detail with the help of the drawings in which:

FIGURE 3 shows a digging machine according to the invention, in the driving position and in a form of design in which the turning disk may be swung in the vertical plane;

FIGURE 4 shows the same machine as in FIGURE 3, but in the digging position.

Figure 5:
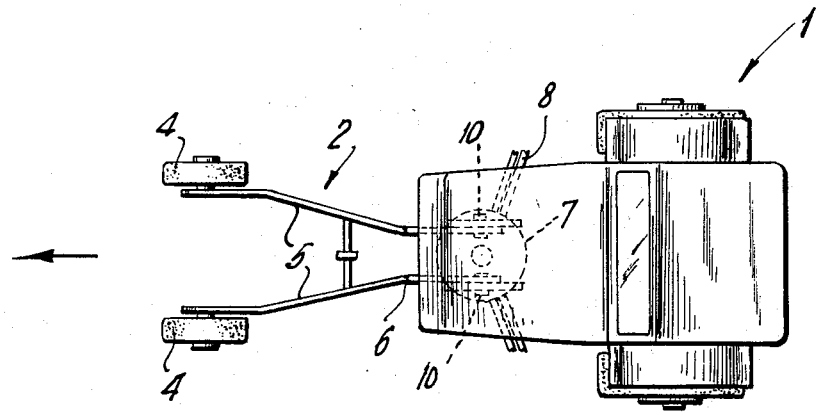
FIG. 5 shows a portion of the digging machine in the driving position.
Figure 6:
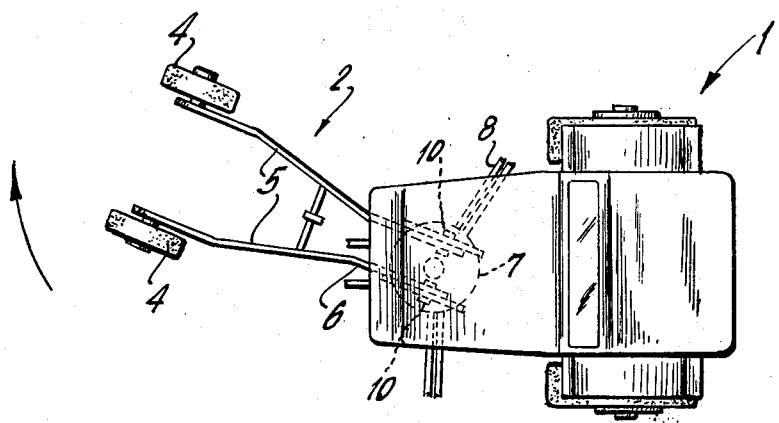

FIG. 6 also shows the digging machine in the driving position, as in FIG. 5 but making a right-hand turn.

In all the figures, the drive unit as a whole is indicated with 1 and the undercarriage by 2. The drive unit 1 consists in both examples of a tractor in which the front wheels and the front suspension have been removed. On the tractor there is, in the usual manner, front-mounted a working implement such as a digging machine arm 3. Instead of the normal suspension of the front wheels 4, these are suspended on arms 5 which protrude out at an angle from the trunk 6 of the undercarriage 2. The drive unit 1 and the undercarriage 2 are linked to one another with the help of a turnable disc 7 which allows a relative turning of the drive unit relative to the undercarriage through 360°. In addition to the two protruding arms 5, the trunk 6 on the undercarriage carries two hydraulically swingable legs 8 which in the driving position are swung clear of the ground.

Figure 1:
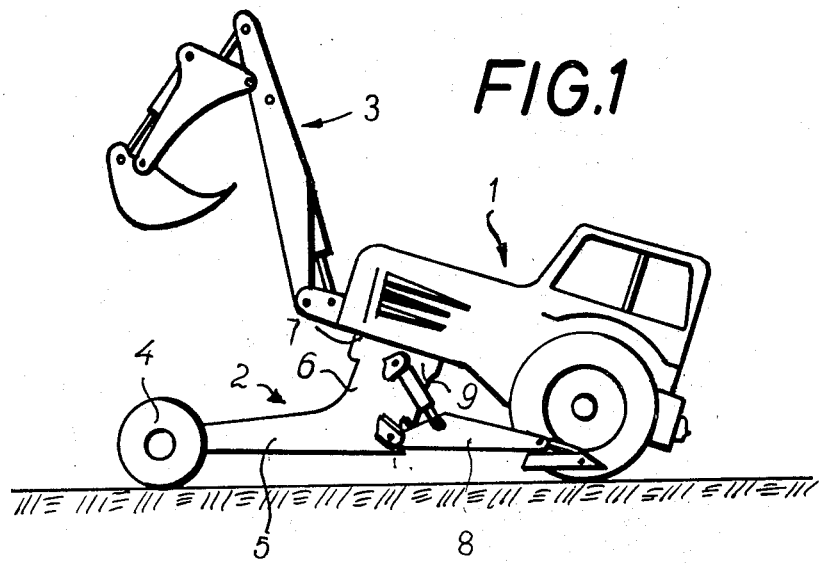
FIGURE 1 shows a design of a digging machine according to the invention, in the driving position.
Figure 2:
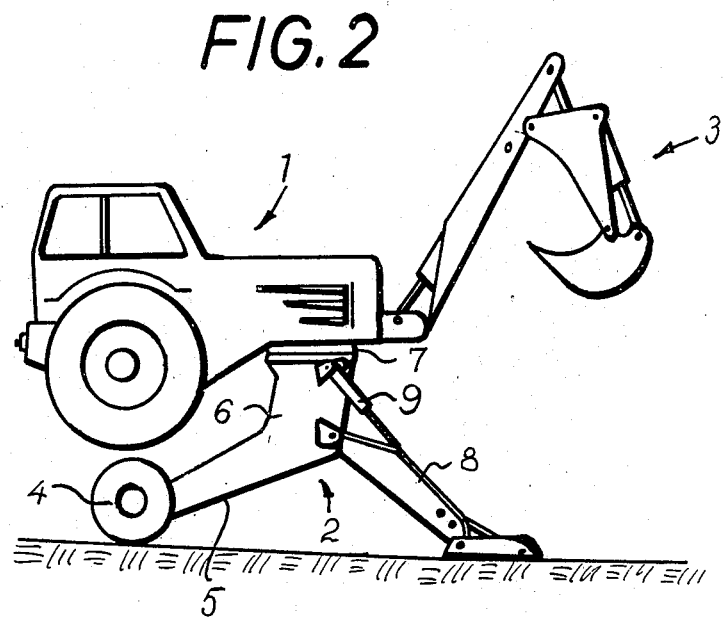
FIGURE 2 shows the same machine in the digging position.

The digging machine according to FIGURES 1 and 2, may be driven in the position as shown in FIGURE 1. The turning of the tractor occurs by the undercarriage 2 being turned about the turning disc 7 with respect to the drive unit 1. FIG. 5 showing the digging machine being driven forwardly as indicated by the arrow, and FIG. 6 showing the digging machine making a right turn. The digging machine thus acquires a high degree of mobility in the field inasmuch as this form of front wheel suspension will act as a link with the result that the vehicle acquires an angle about the swinging axis of the undercarriage. When the digging machine has been driven into position, the supporting legs 8 and swung downwards with the help of the hydraulic cylinders 9 in such a manner that the turning disc 7 comes into the horizontal position such as shown in FIGURE 2. The drive unit 1 may then be turned through 360° about the undercarriage 2 through expedient means, for example a hydraulic motor working against the rim of a gear wheel.

In the example as shown in FIGURE 3, the turning disc 7 is hinged by means of the pivots 10 to the undercarriage 2 so that it may be swung through a vertical plane into the horizontal position about pivots 10 with the help of a hydraulic cylinder 11. In this way the turning disc may be swung into the horizontal position even though the trunk 6 on the undercarriage 2 has a certain angle to the vertical plane. The machine is changed from the driving position wherein the wheels on the drive unit 1 are in contact with the ground, as illustrated in FIGURE 3, to the working or digging position as illustrated in FIGURE 4, by pivoting the hydraulically activated support legs 8 into contact with the ground. Then the drive unit is moved about the pivots 10 upwardly into the horizontal position by means of the hydraulic cylinder 11. As a result of this, the entire digging machine may be made lower in the digging position such as may be seen from FIGURE 4, compared to FIGURE 2.

Even though the above description deals with digging machines, it is clear that the invention, with equal success, may be used as mobile crane or the like.

Having described my invention, I claim:

1. A mobile construction device comprising a drive unit, a pair of wheels mounted on said drive unit, a working implement mounted on said drive unit, an undercarriage, a pair of steering wheels mounted on said undercarriage, means interconnecting said drive unit and undercarriage at a location spaced from said steering wheels on said undercarriage, whereby said drive unit and undercarriage are rotatable in a substantially horizontal plane relative to one another, said drive unit having a driving position and a working position and in the driving position said drive unit and undercarriage are arranged to travel from one place to another on said wheels on said drive unit and said steering wheels on said undercarriage with said steering wheels determining the direction of travel in reliance on the rotational movement of said undercarriage relative to said drive unit, and means secured to said undercarriage for moving said drive unit relative to said undercarriage between its driving position and its working position whereby in the working position said drive unit is supported by said steering wheels on said undercarriage and said means for moving said drive unit relative to said undercarriage, and said drive unit with said working implement thereon being rotatable through 360° relative to said undercarriage.

2. A mobile construction device, as set forth in claim 1, wherein said means for moving said drive unit comprises at least one support leg in contact with the surface on which the mobile device is positioned at a location remote from said wheels on said undercarriage whereby said wheel on said undercarriage and said support leg provide the support for said drive unit in its working position.

3. A mobile construction device, as set forth in claim 2, wherein said means for moving said drive unit comprises a pair of spaced said support legs secured to said undercarriage, a hydraulic piston cylinder and movable piston arm assembly secured to each of said support legs and to said undercarriage whereby in the driving position the hydraulic piston arm is in its retracted position and said support leg is spaced from the surface on which said mobile device is positioned and in the working position the hydraulic piston arm is in its extended position with said support legs contacting the surface on which the mobile device is positioned.

4. A mobile construction device, as set forth in claim 1, wherein said means interconnecting said drive unit and said undercarriage comprising a generally horizontally arranged disc member, a horizontally arranged pivot member positioned in said undercarriage for securing said disc member to said undercarriage whereby said disc member can be positioned about said pivot member in a vertical plane into a horizontal position regardless of the orientation of said undercarriage.

5. A mobile construction device, as set forth in claim 1, wherein said undercarriage comprises a trunk at the end thereof interconnected to said drive unit and a pair of arms extending angularly outward from said trunk section, one of said steering wheels located at the opposite end of each of said arms from said trunk, and in the driving position said arms extending forwardly from the end of said drive unit to which said undercarriage is interconnected.

6. A mobile construction device, as set forth in claim 5, wherein said drive unit is a tractor having said pair of wheels mounted at its rear end and being interconnected to said undercarriage at its front end.

7. A mobile construction device, as set forth in claim 6, wherein said working implement comprises a digging attachment articulated to the front end of said drive unit.

References Cited
UNITED STATES PATENTS

| | | | |
|---|---|---|---|
| 2,781,927 | 2/1957 | Holopainen | 214—138 |
| 3,142,395 | 7/1964 | Pingon | 214—138 |
| 3,243,064 | 3/1966 | Thwaites | 214—138 |
| 3,362,548 | 1/1968 | Cunningham | 214—138 |

HUGO O. SCHULZ, Primary Examiner

U.S. Cl. X.R.
180—1